June 8, 1937.  B. L. MYERS  2,082,969
CLUTCH
Filed June 22, 1935  2 Sheets-Sheet 2

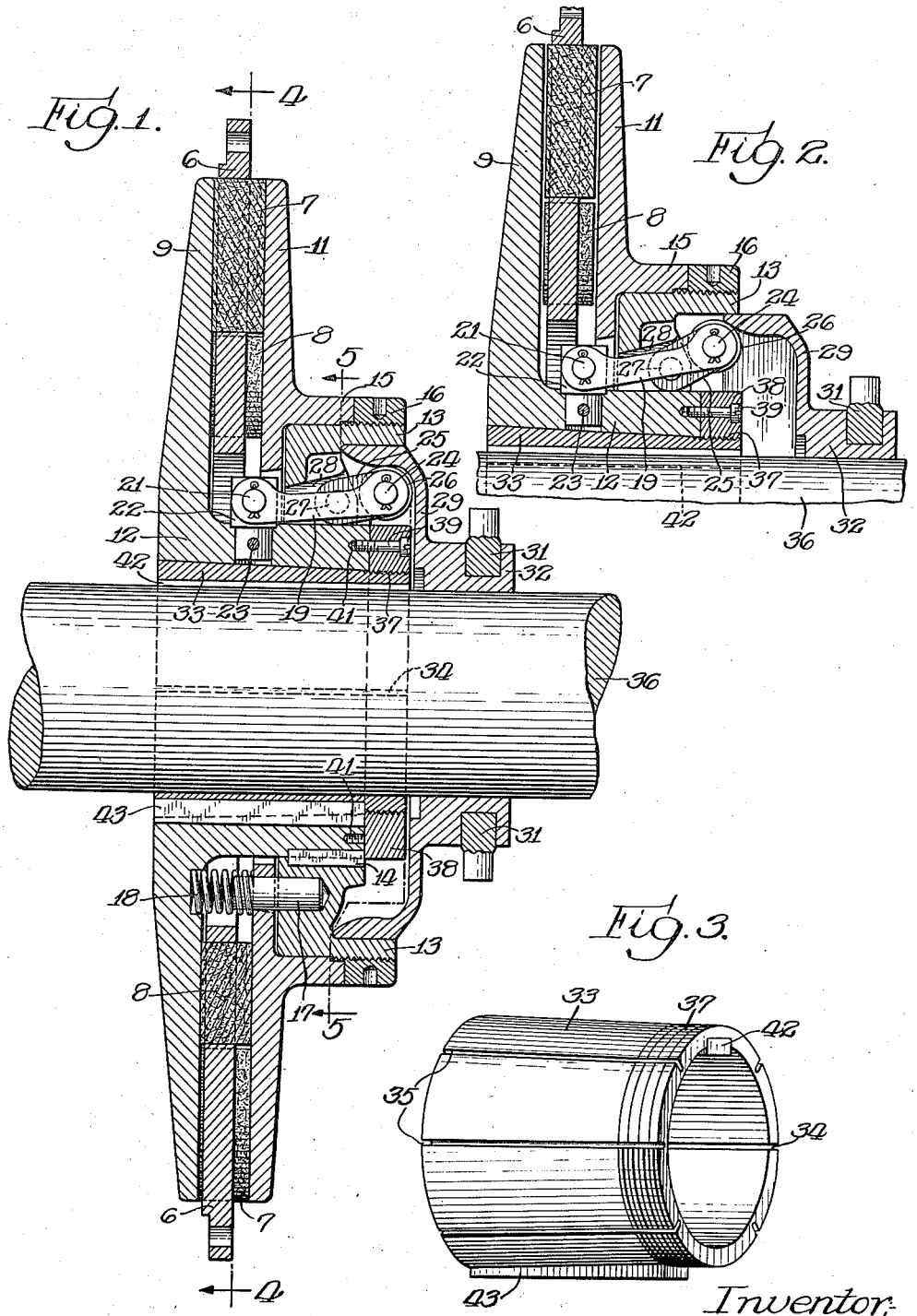

Inventor:-
Bernard L. Myers,
By Wilson, Dowell, McCanna & Foley
Attys.

Patented June 8, 1937

2,082,969

UNITED STATES PATENT OFFICE 2,082,969

CLUTCH

Bernard L. Myers, Mishawaka, Ind., assignor to Dodge Manufacturing Corporation, Mishawaka, Ind., a corporation of Indiana Application June 22, 1935, Serial No. 27,955

3 Claims. (Cl. 192—68)

This invention pertains to clutches and more particularly to the mounting of the same on shafts, the purpose of the invention being to enable the mounting of a clutch upon shafts of different diameters, thereby obviating the necessity of carrying in stock an individual clutch for each different shaft diameter.

A preferred embodiment of the invention is illustrated in the accompanying drawings, referring to which:

Fig. 1 is a diametral sectional view of a mounted clutch embodying my invention;

Fig. 2 is a similar view, fragmentary in character, showing the clutch in released position;

Fig. 3 is a perspective view of an adapter sleeve and the locking splines;

Figure 4:
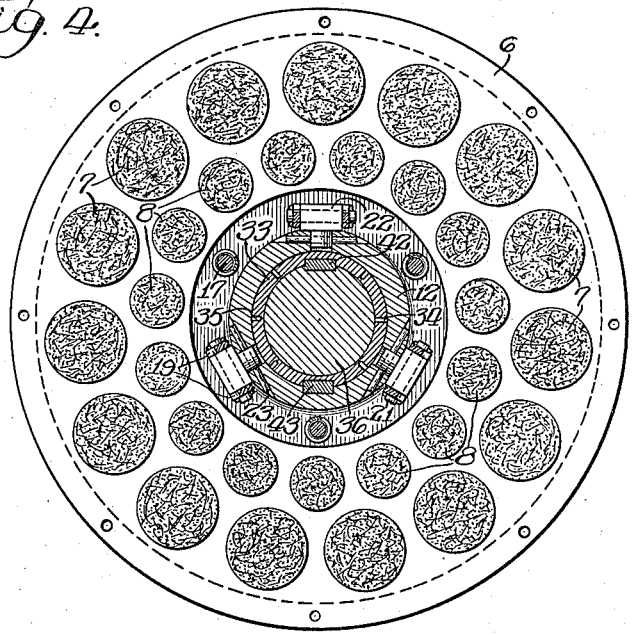
Fig. 4 is a transverse sectional view on the line 4—4 of Fig. 1.

Referring to the drawings more in detail, reference character 6 indicates generally the driven member of the clutch which is here illustrated as comprising a disc provided with a series of openings in which are somewhat loosely disposed composition friction blocks 7 and 8 projecting beyond each face of the disc. Co-operating with the driven member is a driving member comprising a pair of driving elements 9 and 11 disposed parallel with and on opposite sides of the disc 6 and adapted for relative movement toward and from each other to effect a clamping engagement with the composition blocks for driving the driven member or to be freed from said blocks to release the clutch.

It should be understood that this particular structure of driving and driven members is illustrative merely and that the driven member may be merely a flat disc faced with friction material with which the driving elements may cooperate or the friction material may be carried by the driving elements instead of the driven element. Furthermore, the driven element is connected at its periphery to any member to be driven, such for instance as a pulley, or a bell provided with a sleeve mounted on the clutch shaft may be attached at its perimeter to the outer edge of the driven disc whereby the sleeve to which any member to be driven may be attached in a suitable manner is rotated. It should also be obvious that the power may be applied to the disc 6 and transmitted therefrom to the discs 9 and 11 which in that instance become the driven rather than the driving members.

The disc element 9 is carried upon an elongated hub 12 preferably formed integrally therewith, and the disc 6 connected with the member to be driven is rotatable freely about the hub, while the disc 11 is axially movable toward and from the disc 9 but is secured thereto to rotate therewith, as will be now described.

A carrier 13 is splined to the hub 12, as indicated at 14, so as to rotate with the hub but be capable of axial sliding movement thereon. This carrier fits within the hub 15 of the disc 11 and axial adjustment of the disc relatively to the carrier is effected by an adjusting ring 16 threaded onto the outer end of the carrier and abutting the outer face of the hub 15. Driving connection between the carrier and the disc 11 is established by a series of studs or pins 17 anchored in the carrier and extending through suitable openings in the disc 11, these studs also serving as guides for coiled expansion springs 18 interposed between the discs 9 and 11 to normally urge said discs apart into inoperative relation with respect to the driven disc 6.

Figure 5:
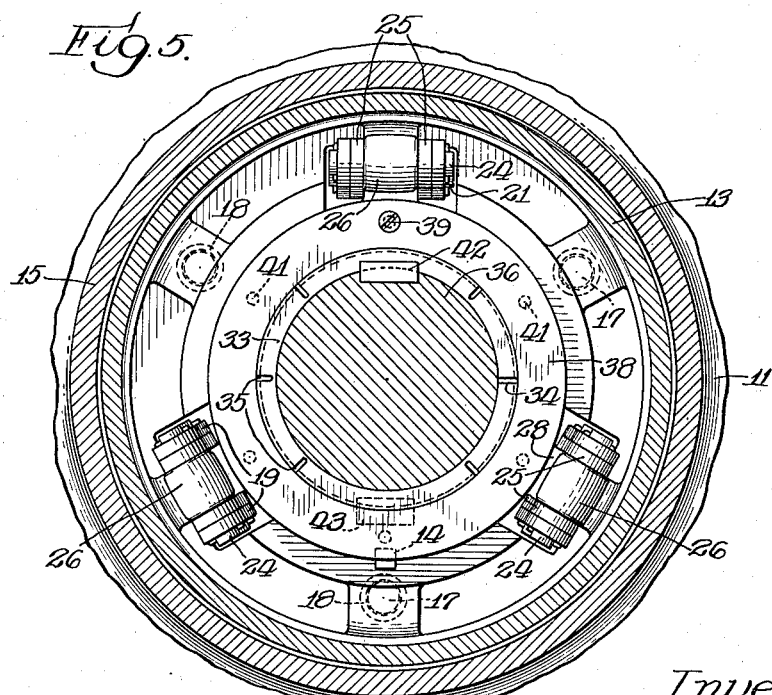
Fig. 5 is a similar view on the line 5—5 of Fig. 1.

The discs 9 and 11 are forced together into clamping relation with the disc 6 and against the force of the springs 18 by suitable toggle mechanism comprising three sets of toggles, as will be apparent from Figs. 4 and 5. Each toggle consists of a pair of spaced links 19 pivoted at one end by a pivot pin 21 to a stud 22 securely anchored in the hub 12, locking pins 23 being utilized to retain the studs against displacement. The outer ends of the links 19 are connected by a pin 24, upon which pin is also mounted the outer ends of a pair of short links 25 and a roller 26 interposed between the links, as best shown in Fig. 5. The inner ends of links 25 are connected by a pin 27 to a stud or ear 28 carried by the carrier 13.

An annular cam 29, preferably of cup shape as shown in Figs. 1 and 2, is telescopically associated with the outer portion of the carrier 13 so that, by any suitable clutch throw lever connected with the yoke 31 embracing the hub 32 of the cam, adjustment of the cam from the position shown in Fig. 1 to that shown in Fig. 2, and vice versa, may be made. When the parts are in the position shown in Fig. 2, with the cam withdrawn, the springs 18 will force the discs 9 and 11 apart and the toggle mechanism will assume the position shown. When, however, the cam is moved to the left, into the position shown in Fig. 1, the cam operating upon the rollers 26 will straighten the toggle into the position shown in Fig. 1, thereby forcing the carrier 13 and the disc 11 to the left to effect a clamping driving relation between the driving discs 9 and 11 and the driven disc 6.

It will be observed that the clutch operating mechanism is all enclosed and housed near the center of the structure thus affording maximum strength, rigidity and longevity. Furthermore, adjustment for wear may be readily effected by adjustment of the ring 16 to position the disc 11 closer to the disc 9.

The clutch thus far described would be suitable for mounting directly upon a clutch shaft if the bore through the clutch hub were exactly the proper size to snugly fit the shaft. Shafts supposedly of the same size are not, however, always exact in their diametral dimensions and furthermore, since these shafts run in various sizes, the provision of a clutch for each size necessitates the carrying in stock of a large number of clutches differing from one another only in the dimensions of the hub bores.

To insure a snug fit and rigid connection between the clutch and its shaft, irrespective of slight variations in the shaft dimensions, and to enable a clutch of a single bore size to be mounted upon shafts of different sizes, thereby reducing the number of clutches required to be kept in stock, my present invention contemplates the utilization of an adapter between the shaft and the clutch hub which will be capable of compensating for considerable variations in shaft size while insuring a strong and rigid connection between the shaft and the clutch hub. The adapter, designated generally by reference character 33 and which is best shown in Fig. 3 of the drawings, comprises a tapered sleeve of steel or similar material split from end to end, as indicated at 34, so as to be capable of variation in diameter and provided with a series of longitudinally extending grooves 35 which contribute toward flexibility of the adapter. The hub 12 is also slightly tapered inwardly from left to right, viewing Figs. 1 and 2, and the sleeve is adapted to be inserted between the shaft 36 and this hub, as shown on the drawings.

For the purpose of forcing the sleeve into wedging relation with the shaft and the surrounding hub and to retain the sleeve in wedging position the smaller end is screw-threaded, as indicated at 37, to receive a similarly threaded ring 38 which, when screwed onto the sleeve, abuts the end of hub 12 and draws the sleeve into wedging position so as to center and lock the hub on the shaft, the ring being thereupon held against unthreading movement by one or more bolts 39 passing through the sleeve and threaded into one of a series of tapped openings 41 formed in the end of the hub.

To preclude rotative movement of the clutch hub relatively to the shaft so that a rigid driving relation between the shaft and clutch is established, a spline 42 is seated in opposed kerfs formed in the inner face of the sleeve, and in the surface of the shaft respectively, thereby locking the sleeve to the shaft. Similarly a second spline 43 is seated in opposed kerfs formed respectively in the exterior and interior walls of the sleeve and hub, thereby locking the sleeve to the hub. In this manner the sleeve is rigidly keyed both to the shaft and the hub so that a positive and rigid driving connection between the shaft and the clutch is established.

Should any looseness develop as the result of wear or abuse, it may be eliminated by tightening up the ring 38. If the clutch is to be mounted upon a shaft of smaller diameter than that disclosed, a sleeve having thicker walls is employed. It will be obvious, therefore, that by carrying in stock a number of adapter sleeves of different thicknesses, a clutch with a standard hub bore may be mounted upon various shafts differing substantially in diametral dimensions.

The structural details illustrated and described may obviously be varied within considerable limits without departing from the essence of the invention as defined in the following claims.

I claim:

1. The combination with a shaft and a clutch member having a hub surrounding the shaft, of a tapered sleeve interposed between said shaft and hub, means comprising keys, one engaging the shaft and sleeve and the other engaging the sleeve and hub, to establish driving connection between the shaft and hub through said sleeve, and means for moving said sleeve into and retaining the same in wedging relation to said shaft and hub.

2. In a friction clutch, coaxial driving and driven members, mechanism operable for establishing driving relation between said members, a clutch hub carrying one of said members and said mechanism, annular means in said hub operable by wedging action to grip said hub and a shaft, adjusting means to cause said wedging action, and a plurality of keying means for establishing a positive driving connection between the shaft and hub through said annular means in addition to the connection established by the frictional engagement of said annular means with the shaft and hub.

3. A friction clutch comprising coaxial clutch members and interposed disk means to be clutched between said members, toggle mechanism connecting said members and operable to force them into coaction, a clutch hub carrying said members and toggle mechanism, an axially operable cup-shaped member telescopically associated with one of said members and having an internal cam for operating said toggle mechanism, annular means in said hub operable by wedging action to grip said hub and a shaft, and adjusting means associated with the hub and annular means for causing such wedging action, said adjusting means and toggle mechanism being enclosed by said cup-shaped member.

BERNARD L. MYERS.